Feb. 28, 1961 M. J. ALGER, JR 2,973,183
LOW FRICTION SLIDING VALVE WITH EDGE-SEALED PORTS
Filed June 12, 1958
Fig. 1
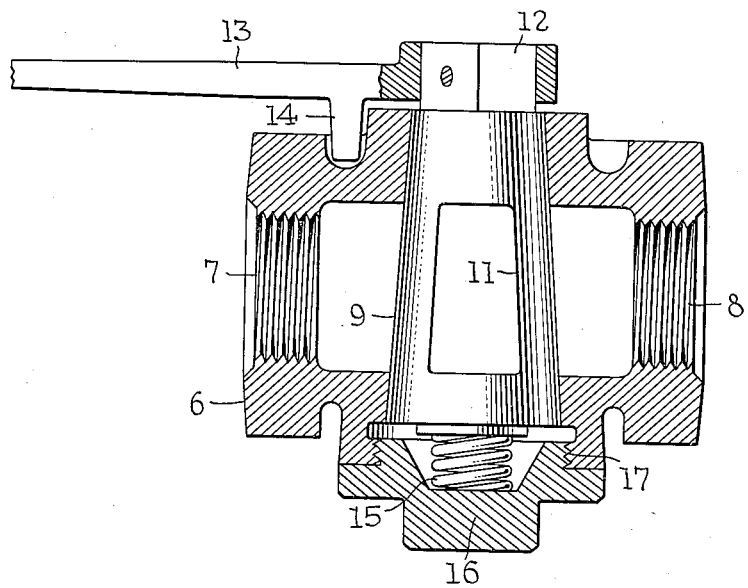
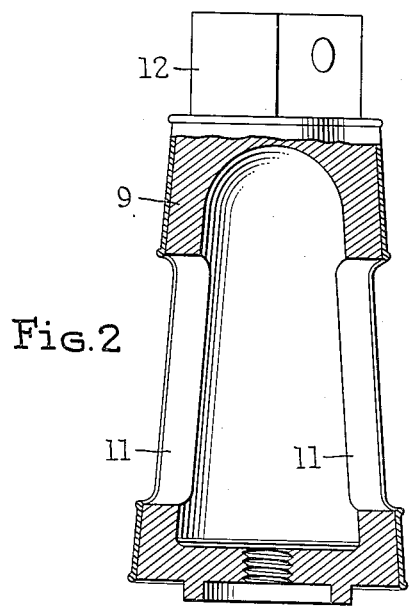
Fig. 2
Fig. 3
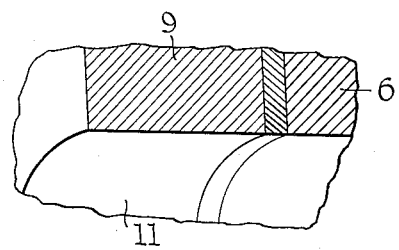
INVENTOR
Martin J. Alger Jr.
BY *Dodge and Sons*
ATTORNEYS United States Patent Office 2,973,183
Patented Feb. 28, 1961

2,973,183

LOW FRICTION SLIDING VALVE WITH EDGE-SEALED PORTS

Martin J. Alger, Jr., Watertown, N.Y., assignor to The New York Air Brake Company, a corporation of New Jersey Filed June 12, 1958, Ser. No. 741,523

3 Claims. (Cl. 251—183)

This invention relates to valves of the type in which a valve member and a seat member, at least one of which is ported, are in face contact and slidable relatively to each other for opening and closing a port or ports.

The invention is particularly well adapted for use in plug cocks, and will be described as embodied in a plug cock, in which the plug is tapered (i.e., conical) and rotates in a valve body having a similar conical seat.

Certain synthetic plastics, notably tetrafluoroethylene resin marketed by Du Pont under the trademark "Teflon," have a notably low coefficient of friction, so low that the differential between static friction and kinetic friction, between two "Teflon" surfaces in sliding contact, is remarkably low. Applicant learned this from the technical literature and initially his effort was merely to avail of the known low-friction properties.

Applicant is an engineer in the development department of The New York Air Brake Company and thought that "Teflon" might be an ideal facing for valves in which the sealing surfaces are in sliding contact, particularly the plug cocks extensively used in air brakes and, because of their erratic sticking characteristic, a prolific source of trouble. The basic principle of an automatic air brake involves control of the brakes by changes of pressure in the "brake pipe," and the history of the art has centered on remarkably successful efforts to increase sensitivity to these changes of pressure. So successful has the effort been, that pressure waves are propagated through the brake pipes at speeds well over 900 feet per second and actually close to the speed of sound. Even cautious manipulation of a sticky cock controlling an automatic brake pipe can cause an undesired emergency application, and this entails a long recharging operation.

Starting with the bare idea of using "Teflon" surfaces to reduce friction in valves, applicant has attained that end in an intensified degree, and in addition has reduced leakage and made it possible to use cast iron instead of bronze for cock plugs.

Stripped to bare essentials, a dispersion of pure "Teflon" in water is sprayed on the cock plug. Instead of seeking a uniform coating, which was normal procedure in coating with "Teflon," viscosity of the sprayed dispersion and rate of spraying are so chosen that ridges (so-called "beads") of "Teflon" form on each angular edge, i.e., at the end margins of the plug and at edges of the port or ports. By using at least two spray coats, and baking at about 750° F. after each coat, an adequate and strongly adherent coat of "Teflon" was developed. It was found unnecessary to spray coat (and even advantageous not to spray-coat) the bore or seat in the cock body. Instead, the coated and baked plug was pressed into the seat and rotated (or oscillated) to offset a part of the plug coating onto the surface of the seat. The result is an ideally smooth engagement between plug and seat, which have bounding areas in which the pressure flattened beads afford peculiarly effective seals.

Details will now be elaborated by reference to the accompanying drawing which shows a typical plug cock, and in which:

Fig. 1 is an axial section through a simple form of plug cock, the section being on the plane common to the axis of the bore of the body and the axis of the conical plug. No attempt is here made to illustrate the "Teflon" coating which is approximately .0006" thick.

Fig. 2 is an axial section through the cock plug on a larger scale and on a diametric plane at 90° to the plane of section of the plug as it appears in Fig. 1. In this view, the coating and the "beads" are each greatly exaggerated in thickness.

Fig. 3 is a fragmentary section on an even more enlarged scale, intended to indicate how one of the beads is swaged down.

In Fig. 1 the cock body 6 has an axial bore which terminates in pipe-threaded openings 7 and 8, one at each end of the body. The cock plug 9 is a truncated cone with a through port 11 which, in Fig. 1, extends crosswise of the bore of the cock body so that the plug obstructs the bore. The plug has a squared end 12 which receives a handle 13. The handle is ordinarily pinned to the plug. Rotary motion of the plug is limited between an open position and a closed position by a lug 14 so located on the handle as to engage stops on the body. The plug 9 is urged axially into its conical seat by a coil compression spring 15 which is confined between the large end of the plug and a spring seat 16 whose form is clearly shown in Fig. 1. It is threaded at 17 into the body.

Since the contemplated thickness of the "Teflon" coating is approximately one-half thousandth of an inch, the cock differs in no great respect from commercial cocks. Nothing is coated on the cock body, but the plug is sprayed with a suspension of "Teflon" in water. The viscosity of the suspension is so chosen and the spraying operation is so carried out as to produce a reasonably uniform coating on the conical portions of the plug and still assure the formation of well defined beads or ridges along angular portions of the cock plug. These angular portions are on the bounding edges of the conical parts of the plug and on the outer edges of the port or ports through the plug. After the plug has been sprayed and allowed to dry, it is baked, after which the coating and baking steps are repeated at least once. Two coats are ordinarily sufficient but more may be used. A single coat is not ordinarily adequate.

After the plug has had its second coat and has been baked, it is inserted in the corresponding body and worked into its seat. This operation involves rotation of the plug or rotary oscillation of the plug in the body, and results in the transference of a thin film of "Teflon" from the plug to the interior of the cock seat. It further results in flattening and compacting the beads. The effect is to produce on the conical mating surfaces, narrow areas near the edges of the surfaces which slide in contact where the "Teflon" is compacted and worked into an excellent sealing form. This treatment is believed to be better than one involving spray-coating of the valve seat in the cock body as well as spray-coating of the plug. In any event, the method produces a strongly adherent coating and a cock characterized by smooth free action. Not only does the coating give good lubricating properties, but it also affords a protective coating so firmly attached that it is practicable to use "Teflon"-coated cast iron cock plugs, instead of the more expensive bronze or brass plugs commonly used.

It is believed that "Teflon," being a polymer, is subject to some variation of its physical properties. The term "Teflon" has been used to take advantage of such latitude as the nature of this synthetic polymer permits, and avoid the rigid implications of chemical symbols.

In the opening paragraph of this application, the invention has been described as adapted to valves in which the valve member and the seat member are in face contact and slidable relatively to each other. The rotary conical cock member slides in face contact with the mating seat, and so is typical, but the invention is applicable to various valves in which the valve and seat are slidable relatively to each other in face contact, at least one of said members being ported.

Within this broad classification, there fall various types of valves well known in the valve art. Except where specifically stated, the claims are not to be limited to any particular type of geometrical surface such as the conical one hereinabove discussed.

What is claimed is:

1. A valve comprising two relatively slidable valving members, each having a valving face; means defining a transverse surface on one of the valving members which intersects the valving face, the intersection defining a sharp edge in the valving face; a thin adherent coating of Teflon on the valving face of said one valving member, the coating having a bead along said edge in the unstressed condition; and means for retaining said valving members in an operative relationship so that the bead on the coating is deformed and the coating assumes a uniform depth at all points where it is confined between the two valving members.

2. The valve defined in claim 1 in which the intersection of the transverse surface and the valve face forms a port which is surrounded by the edge and its compressed head portion of the Teflon coating.

3. The valve defined in claim 1 including means defining a second transverse surface on said one valving member which intersects and defines a sharp edge in the valving face, the two transverse surfaces being so arranged that the sharp edges with their compressed head portions of the Teflon coating enclose a substantial portion of the valving face.

References Cited in the file of this patent

UNITED STATES PATENTS

| | | |
|---|---|---|
| 1,979,910 | Scott | Nov. 6, 1934 |
| 2,776,104 | Sinkler | Jan. 1, 1957 |
| 2,807,511 | Fleming | Sept. 24, 1957 |
| 2,832,563 | Walsh | Apr. 29, 1958 |
| 2,864,579 | Stoltenberg | Dec. 16, 1958 |

FOREIGN PATENTS

| | | |
|---|---|---|
| 770,484 | Great Britain | Mar. 20, 1957 |